(12) United States Patent
Young

(10) Patent No.: US 8,923,017 B2
(45) Date of Patent: Dec. 30, 2014

(54) POWER CONVERTER IMPLEMENTING FREQUENCY SMEARING

(75) Inventor: George Young, Dublin (IE)

(73) Assignee: Texas Instruments (Cork) Limited, Dublin (IE)

( * ) Notice: Subject to any disclaimer, the term of this patent is extended or adjusted under 35 U.S.C. 154(b) by 876 days.

(21) Appl. No.: 12/678,070

(22) PCT Filed: Sep. 12, 2008

(86) PCT No.: PCT/EP2008/062206
§ 371 (c)(1),
(2), (4) Date: Dec. 1, 2010

(87) PCT Pub. No.: WO2009/034180
PCT Pub. Date: Mar. 19, 2009

(65) Prior Publication Data
US 2011/0080757 A1    Apr. 7, 2011

(30) Foreign Application Priority Data
Sep. 12, 2007  (IE) .................... S2007/0648

(51) Int. Cl.
*H02M 3/335*    (2006.01)
*H02M 3/337*    (2006.01)
*H02M 3/338*    (2006.01)
*H02M 3/42*     (2006.01)

(52) U.S. Cl.
CPC .......... *H02M 3/3376* (2013.01); *Y02B 70/1475* (2013.01); *Y02B 70/1433* (2013.01); *H02M 3/33592* (2013.01)
USPC .................. 363/21.02; 363/21.06; 363/21.07; 363/21.1; 323/290

(58) Field of Classification Search
USPC ......... 323/259, 266, 268–272, 282, 290, 293, 323/300, 301, 306, 307, 328, 332, 333, 340, 323/342, 344–346, 351; 363/21.02, 21.06, 363/21.03, 21.07, 21.09, 21.1, 21.11, 21.12, 363/21.14–21.18, 45–48, 52–53, 67–72, 363/81–82, 86, 89, 90, 101, 125–127
See application file for complete search history.

(56) References Cited

U.S. PATENT DOCUMENTS 4,357,654 A * 11/1982 Ikenoue et al. ............ 363/21.06
4,533,986 A *  8/1985 Jones ............................. 363/17

(Continued)

FOREIGN PATENT DOCUMENTS

WO    WO2005101632    10/2005

OTHER PUBLICATIONS

PCT Search Report.

(Continued)

*Primary Examiner* — Adolf Berhane
*Assistant Examiner* — Nusrat Quddus
(74) *Attorney, Agent, or Firm* — William B. Kempler; Frederick J. Telecky, Jr.

(57) ABSTRACT

The present invention relates to a power converter (90) and a method of operating same. There are numerous advantages to operating power converters using a series resonant converter (1, 21). This approach is particularly suitable for minimizing switching losses in the power converter when it is operated at high frequency. However, there are problems with the known converters in that they are prone to generate noise in the acoustic spectrum due to the fact that the converter stages are often operating at different frequencies. The present invention relates to a power converter and a method of operating same that enables the operating frequency of the converter to be controlled by a control circuit over a predetermined range of the resonant frequency. This allows reduction in acoustic noise generation and facilitates frequency smearing that will in turn reduce spectral peaks. This is achieved while maintaining output ripple within acceptable ranges.

18 Claims, 5 Drawing Sheets

(56) References Cited

U.S. PATENT DOCUMENTS

| | | | |
|---|---|---|---|
| 5,157,592 A * | 10/1992 | Walters | 363/17 |
| 5,327,333 A * | 7/1994 | Boylan et al. | 363/21.04 |
| 5,402,329 A * | 3/1995 | Wittenbreder, Jr. | 363/16 |
| 5,691,627 A * | 11/1997 | Shum | 323/222 |
| 5,900,701 A * | 5/1999 | Guhilot et al. | 315/307 |
| 5,991,171 A * | 11/1999 | Cheng | 363/21.03 |
| 5,999,433 A * | 12/1999 | Hua et al. | 363/132 |
| 6,344,979 B1 | 2/2002 | Huang et al. | |
| 6,788,554 B2 * | 9/2004 | Havanur | 363/21.06 |
| 6,807,073 B1 * | 10/2004 | Scarlatescu | 363/34 |
| 7,023,710 B2 * | 4/2006 | Durbaum et al. | 363/19 |
| 7,176,660 B2 * | 2/2007 | Usui et al. | 323/207 |
| 7,277,305 B2 * | 10/2007 | Young et al. | 363/132 |
| 7,558,083 B2 * | 7/2009 | Schlecht | 363/21.06 |
| 7,911,812 B2 * | 3/2011 | Colbeck et al. | 363/21.02 |
| 8,014,172 B2 * | 9/2011 | Reinberger et al. | 363/16 |
| 2002/0044470 A1 * | 4/2002 | Hua | 363/127 |
| 2004/0165405 A1 * | 8/2004 | Richard-Farrington | 363/21.06 |
| 2006/0062026 A1 * | 3/2006 | Wittenbreder | 363/21.06 |
| 2006/0187686 A1 | 8/2006 | Sun et al. | |
| 2006/0243716 A1 * | 11/2006 | Stava et al. | 219/130.5 |
| 2008/0031014 A1 * | 2/2008 | Young | 363/16 |
| 2008/0247194 A1 | 10/2008 | Ying et al. | |
| 2009/0129130 A1 * | 5/2009 | Young et al. | 363/84 |
| 2009/0279331 A1 * | 11/2009 | Young et al. | 363/84 |
| 2009/0310392 A1 * | 12/2009 | Young | 363/126 |

OTHER PUBLICATIONS

"Reduce EMI on a Micro (EE Tip #109)," The World's Source for Embedded Electronics Enginee, Posted on Nov. 4, 2013 by Circuit Cellar Staff, http://circuitcellar.com/ee-tips/reduce-emi-on-micro-ee-tip-109/.

* cited by examiner

POWER CONVERTER IMPLEMENTING FREQUENCY SMEARING

INTRODUCTION

This invention relates to a power converter and in particular to a power converter operating using resonant mode power conversion. The invention further relates to a method of operating such a power converter.

It is generally well known that resonant-type power conversion can improve the efficiency of a power converter. Two known approaches that are particularly appropriate are resonant converters that can achieve zero-current switching ("ZCS") and zero-voltage switching ("ZVS"). Such converters can operate with zero power-train switching losses. This is highly desirable. A further level of loss reduction may be achieved by using resonant gate drives, and more specifically, resonant transition types. These allow the gate driving power requirement to be reduced significantly, thus contributing further to loss reduction.

Heretofore, various constructions of resonant converters have been proposed that are suited to achieving such performance. It is understood that operation of power converters with a DCDC transformer (fixed ratio) section can be advantageous, preceded typically by a buck pre-regulator. One such implementation of converter with a DCDC transformer preceded by a pre-regulator is that described in the applicants own co-pending PCT patent application No. PCT/EP2006/067245, the entire disclosure of which and in particular the general architecture of the converter is incorporated herein by way of reference. There are however problems with the known types of constructions. By and large, these converters do not permit synchronisation to an accurate signal such as a reference signal from another stage of the power converter, and therefore synchronization across a number of stages of the power converter is not possible. Typically, these converters also do not facilitate frequency smearing as may be desired to limit spectral peaks in the context of ACDC converters in particular.

It is an object therefore of the present invention to provide a power converter that overcomes at least some of the difficulties with the known power converters. It is a further object of the present invention to provide a power converter with improved efficiency.

STATEMENTS OF INVENTION

According to the present invention there is provided a power converter comprising a fixed ratio DCDC transformer section preceded by a pre-regulator section, characterised in that the fixed ratio DCDC transformer section further comprises an LLC resonant converter, and in which the operating frequency of the power converter is lower than the series resonant frequency and there is provided a control circuit operable to alter the operating frequency of the power converter over a limited range with respect to the resonant frequency. By having such a power converter, the synchronisation of stages and/or frequency smearing is facilitated which can be advantageous in reducing electromagnetic emissions.

In one embodiment of the present invention there is provided a power converter in which the LLC resonant converter further comprises a series resonant converter.

In one embodiment of the present invention there is provided a power converter in which the control circuit is operable to continuously gradually alter the operating frequency of the power converter over the limited range with respect to the resonant frequency.

In one embodiment of the present invention there is provided a power converter in which the control circuit is operable to sequentially alter the operating frequency of the power converter by a predetermined amount over the limited range with respect to the resonant frequency.

In one embodiment of the present invention there is provided a power converter in which the control circuit is operable to alter the operating frequency over a range of 10% of the resonant frequency. In one embodiment of the present invention there is provided a power converter in which the control circuit is operable to alter the operating frequency over a range of up to 15% of the resonant frequency.

In one embodiment of the present invention there is provided a power converter in which the control circuit is operable to alter the operating frequency over a range of up to 20% of the resonant frequency. In one embodiment of the present invention there is provided a power converter in which the control circuit is operable to alter the operating frequency over a range of up to 30% of the resonant frequency.

In one embodiment of the present invention there is provided a power converter in which the control circuit is operable to alter the operating frequency of the converter to create a non-zero deadtime in the feed to the output capacitor.

In one embodiment of the present invention there is provided a power converter in which the control circuit has means to alter the operating frequency of the converter by adjusting the frequency of the drive signals to a plurality of switching elements in the control circuit.

In one embodiment of the present invention there is provided a power converter in which there is provided a secondary switch drive scheme, the secondary switch drive scheme comprising a full bridge drive structure.

In one embodiment of the present invention there is provided a power converter in which there is provided a secondary switch drive scheme, the secondary switch drive scheme comprising a half bridge drive structure.

In one embodiment of the present invention there is provided a power converter in which the secondary switch drive scheme comprises control circuitry capable of clamping a drive winding during a deadtime.

In one embodiment of the present invention there is provided a power converter in which the secondary switch drive scheme comprises a clamped resonant transition drive circuit switchable to maintain current in a resonant clamp drive transformer on the secondary side.

In one embodiment of the present invention there is provided a power converter in which the pre-regulator section further comprises a buck pre-regulator.

In one embodiment of the present invention there is provided a power converter in which the control circuit operable to alter the operating frequency of the converter comprises a synchronisation circuit to synchronise to an external oscillator.

In one embodiment of the present invention there is provided a power converter in which the control circuit operable to alter the operating frequency of the converter has means to implement a smearing approach.

In one embodiment of the present invention there is provided a power converter comprising a half bridge power stage. In one embodiment of the present invention there is provided a power converter comprising a full bridge power stage.

In one embodiment of the present invention there is provided a method of operating a power converter of the type comprising a fixed ratio DCDC transformer section preceded by a pre-regulator section, the power converter further comprising an LLC resonant converter operating at a resonant frequency and a control circuit, the method comprising the steps of:

operating the power converter at an operating frequency lower than the resonant frequency; and altering the operating frequency of the converter over a limited range with respect to the resonant frequency.

In one embodiment of the present invention there is provided a method in which the LLC resonant converter further comprises a series resonant converter.

In one embodiment of the present invention there is provided a method further comprising the step of continuously gradually altering the operating frequency of the power converter over the limited range with respect to the resonant frequency.

In one embodiment of the present invention there is provided a method further comprising the step of sequentially altering the operating frequency of the power converter by a predetermined amount over the limited range with respect to the resonant frequency.

In one embodiment of the present invention the method comprises altering the operating frequency over a range of up to 10% of the resonant frequency. In one embodiment of the present invention the method comprises altering the operating frequency over a range of up to 15% of the resonant frequency. In one embodiment of the present invention the method comprises altering the operating frequency over a range of up to 20% of the resonant frequency.

In one embodiment of the present invention the method further comprises the step of altering the operating frequency of the converter to create a non-zero deadtime in the feed to the output capacitor.

In one embodiment of the present invention the method further comprises the step of clamping a drive winding during a deadtime.

In one embodiment of the present invention the method further comprises the step of switching a clamp winding to maintain current in a resonant clamp drive transformer on the secondary side.

In one embodiment of the present invention the method further comprises the step of altering the operating frequency of the converter thereby implementing a frequency smearing approach.

DETAILED DESCRIPTION OF THE INVENTION

The invention will now be more clearly understood from the following description of some embodiments thereof given by way of example only with reference to and as illustrated by the accompanying drawings in which:—

Figure 1:
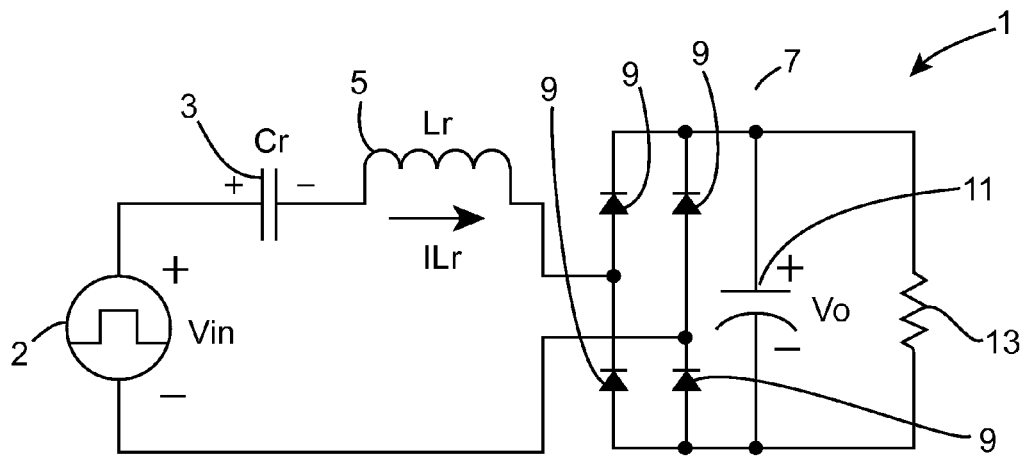
FIG. 1 is a circuit schematic of a resonant mode power converter known in the art.
Figure 2:
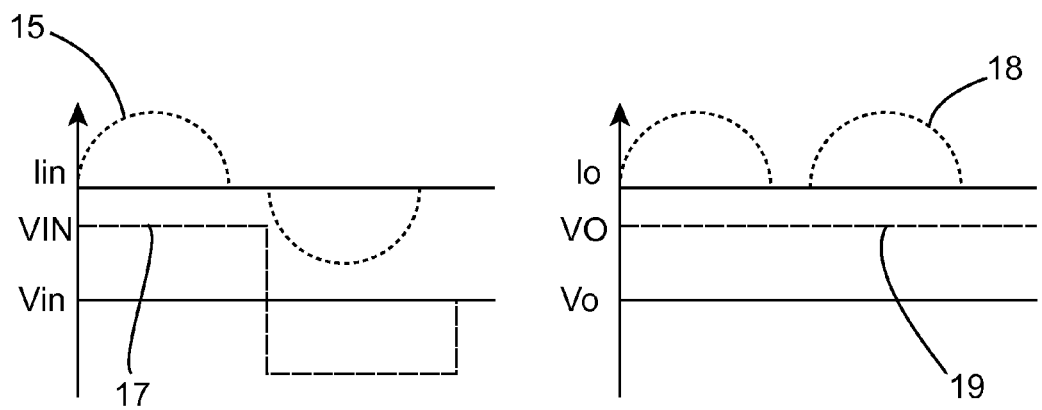
FIG. 2 shows wave diagrams relating to the circuit shown in FIG. 1.

Referring to the drawings and initially to FIG. 1 thereof, there is shown a circuit forming part of the state of the art, indicated generally by the reference numeral 1, comprising a voltage source 2, a capacitor 3, an inductor 5, a full bridge 7 which in turn comprises four diodes 9, an output capacitor 11 and an output resistor 13. The capacitor 3 and inductor 5 are series resonant elements. Referring to FIG. 2 of the drawings, it can be seen from the wave diagrams that the input current $I_{in}$, 15, goes to zero some time before the crossover point of the input voltage $V_{in}$, 17, thereby facilitating zero voltage switching. The magnetising current of the transformer (not shown) can effect zero voltage switching without the interfering influence of the load current. The resulting current, $I_o$, and voltage, $V_o$, output waveforms 18, 19 respectively are shown.

Figure 3:
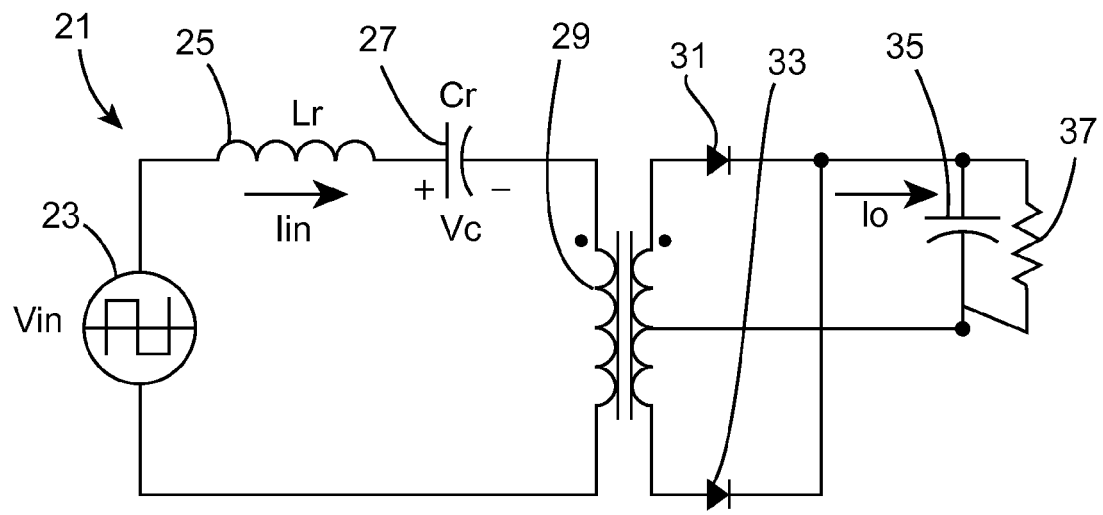
FIG. 3 is a circuit schematic of another resonant mode power converter known in the art.
Figure 4:
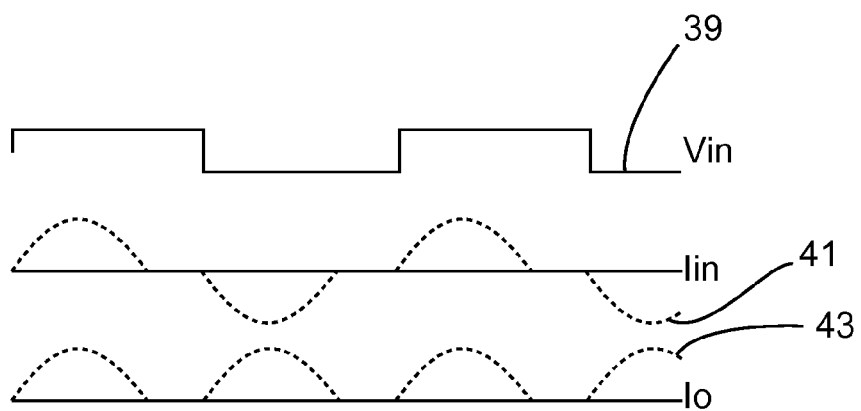
FIG. 4 shows wave diagrams relating to the circuit shown in FIG. 3.

Referring to FIG. 3 of the drawings, there is shown a circuit also forming part of the state of the art, indicated generally by the reference numeral 21, comprising a voltage source 23, an inductor 25, a capacitor 27, a centre tapped transformer 29, a pair of diodes 31, 33, an output capacitor 35 and an output resistor 37. The capacitor 27 and inductor 25 are series resonant elements. Referring to FIG. 4, there are shown the resultant wave diagrams of the circuit shown in FIG. 3 for input voltage, $V_{in}$, 39, input current, $I_{in}$, 41 and output current, $I_o$, 43.

The circuit shown in FIG. 3 operates under the conditions:

$$\Delta V_{cr} < 2*\{V_o + V_{in}\}$$

and $$f_r \geq f_s \geq \frac{1}{8}\{1/(R*C_r)\}$$

and the critical point is obtained from:

$$f_c = (Q*\omega_r)/8,$$

where $$Q = \sqrt{\{(L_r/C_r)/R_{load}\}} \text{ and } \omega_r = 1/\sqrt{\{L_r*C_r\}}$$

It is known that gate drive power requirements can account for excessive power loss as converters are required to operate at higher frequencies. Deployment of resonant-transition type drive schemes has been disclosed in several examples of prior art. In the present case, as an arbitrary period of diode-mode operation of the output synchronous rectifiers up to approximately 20% of the half-period is required, a different gate drive scheme is appropriate.

Figure 5:
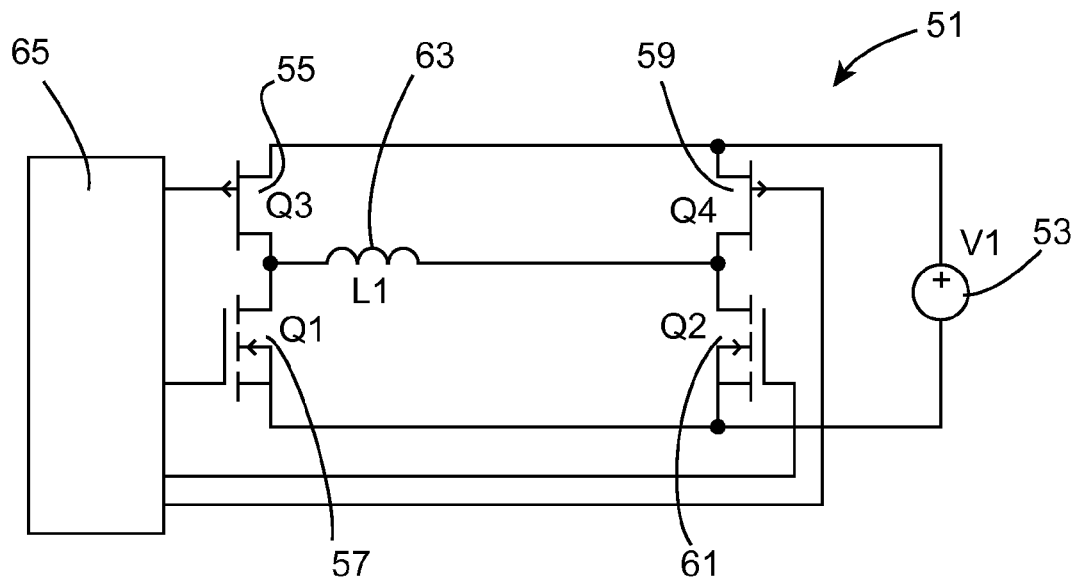
FIG. 5 is a circuit schematic representation of a gate drive scheme for secondary power switches for use in conjunction with an LLC resonant converter according to the invention.

Referring to FIG. 5 of the drawings, there is shown a gate drive scheme for secondary side power switches, indicated generally by the reference numeral 51 comprising a voltage source 53 and a plurality of switches, 55, 57, 59 and 61. There is further provided a gate drive transformer primary winding 63 and a secondary drive control circuit 65 having means to control the active mode and freewheeling conditions. Other parts and stages of the power converter have been omitted for clarity and it will be readily understood by the skilled addressee how the gate drive scheme would be implemented as part of an overall power converter.

The secondary drive control circuit 65 is capable of performing active drive and clamping as appropriate. In the freewheeling part of the cycle, it is possible for the secondary drive control circuit 65 to clamp the primary winding 63 and retain the energy within the magnetising inductance of the transformer. This is achieved using the full bridge drive circuit as shown and by switching on either switches 55 and 59 together (the upper pair of switches shown in FIG. 5) or alternatively switching on switches 57 and 61 simultaneously (the lower pair of switches shown in FIG. 5) during the freewheeling interval. The purpose of the secondary drive control circuit 65 is to achieve a slaved duty cycle ratio. It thus operates by allowing resonant half periods followed by deadtimes having a duration of up to 20% of the resonant half periods. The output of the full bridge implementation of the drive circuit shown in FIG. 5 can be used to drive any double ended circuit including a full bridge power stage or half bridge power stage.

It will be appreciated that a half bridge drive circuit can be employed but typically in such an implementation a separate clamp winding is required with associated switches. The associated switches can be driven with complementary drives with a small gap between them to allow for magnetising current transitions.

It will be understood that the implementation shown can be incorporated in a power converter (not shown) having a fixed ratio DCDC transformer stage preceded by a buck pre-regulator stage as part of the DCDC transformer stage.

The series resonant converter 51 can be operated with low-Q elements in this DCDC transformer role. By low-Q, what is meant is a Q value having an order of magnitude of between 0.5 and 5, preferably having an order of magnitude of unity. When operated in this fashion, it is advantageous to provide the operating frequency below the resonant frequency. In other words, the period of the operating frequency is longer than the resonant period. The mid-point voltage of a capacitive divider as used in a half-bridge implementation can also be constrained such that under the normal range of loading this voltage is bounded by the supply rails.

Figure 6:
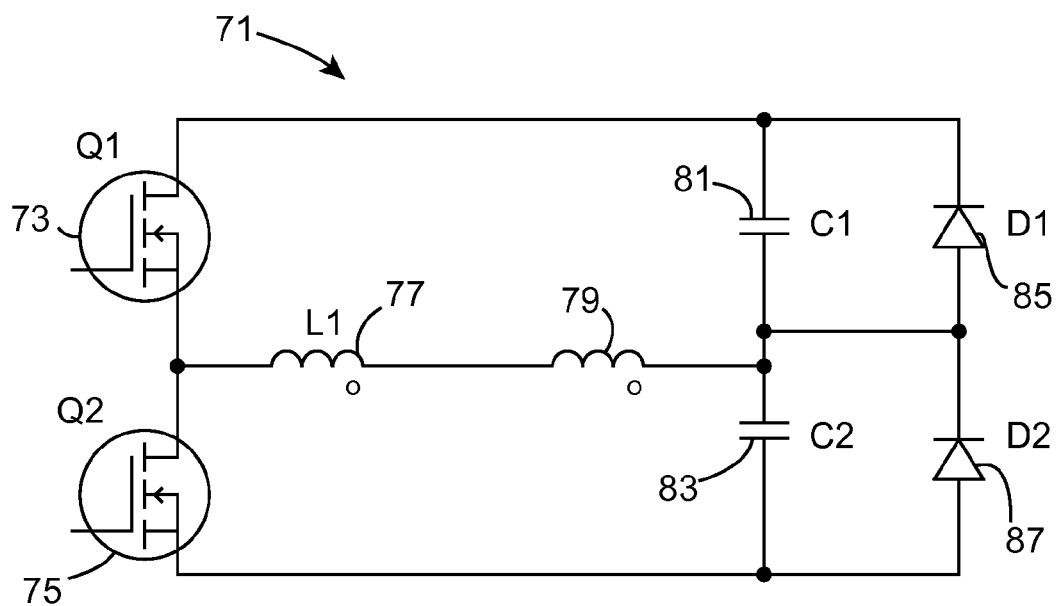
FIG. 6 is a circuit schematic representation of a half bridge implementation of series resonant converter according to the invention.

Referring to FIG. 6 of the drawings there is shown a half bridge implementation of a series resonant converter according to the present invention, indicated generally by the reference numeral 71, comprising a pair of switches 73, 75, a resonant inductor 77, a transformer primary 79, a pair of resonant capacitors 81, 83 and a pair of current limiting diodes 85, 87.

In use, when operated with an output rectifier composed of diodes (or synchronous rectifiers emulating diodes) the current in the load reduces to zero at a fixed interval before the zero-crossing. This interval depends on various circuit parameters and can typically be up to 15% or 20% of the total resonant half-period. The resonant half period is set by the LC series resonant elements in the converter and the overall period is set by a control circuit providing the gate drive scheme for the power switches 73, 75 feeding the LC resonant circuit. The difference between the two is the deadtime. This provides an opportunity to vary the operating frequency corresponding to varying the operating period over a large part of this range. The power converter can also be configured to allow for enough magnetizing current such that the magnetising current provides zero voltage switching (ZVS) operation of all switches, and this functionality is not materially changed by the ability to alter the period within the range as outlined above.

By having such an approach, it is possible to create a deadtime and the power converter can switch at a frequency range ensuring a non-zero deadtime (as the upper frequency bound) and not having an impractically low duty cycle, as corresponds to the lowest practical frequency. By having such a configuration, it is possible to use the deadtime to cause smearing. The operating frequency of the power converter may be continuously varied (frequency smearing) and as a consequence of varying the operating frequency, the deadtime varies. This also facilitates a clamped resonant transition gate drive approach for the synchronous rectifiers, both of which will add materially to the effectiveness of the converter.

One advantage of the present invention is that frequency smearing can be employed which enables limitation of the EMC spectral peaks and also synchronisation can be employed with respect to a preceding or succeeding converter. It is seen as advantageous to ensure that all the converters in a system share the same frequency. This can be effected by slaving their drive oscillators. These techniques can provide limitation of ripple current in capacitors, minimization of beat-frequency effects and the like. By limiting the ripple current, the longevity of the capacitor can be improved. Minimization of beat frequency effects will reduce acoustic noise in the converter. In the embodiment shown, the resonant converter is a series resonant converter but it will be understood that an LLC resonant converter could equally well be used to good effect as the resonant converter. In the various embodiments shown, it will be understood that an LLC resonant converter may be substituted for the series resonant converter and may be preferred in certain implementations.

Taking a practical example, the resonant frequency may be in the region of 550 kHz. By altering the operating frequency over a limited range, for example between 480 kHz and 530 kHz, frequency smearing will occur which enables limitation of the spectral peaks by spreading the EMI spectrum. The operating frequency may be sequentially increased or decreased back and forth within the range (480 kHz to 530 kHz) in small increments, for example in 200 Hz steps every 5 ms or in larger or smaller increments more or less frequently. Similarly, a smooth ramp between the two bounds of the operating range (480 kHz to 530 kHz) may be used to alter the frequency in a continuous, gradual manner. At such high frequencies, the circuit will usually be very sensitive to EMI. Usually, altering the operating frequency of the converter will have a direct effect on the voltage which can have very disadvantageous side effects. However, many series resonant converters and LLC resonant converters with low Q-values have a relatively flat voltage/frequency characteristic in which altering the frequency in a certain range will not cause a significant increase in voltage. Therefore, it is possible to alter the operating frequency when using these implementations.

Figures 7, 8:
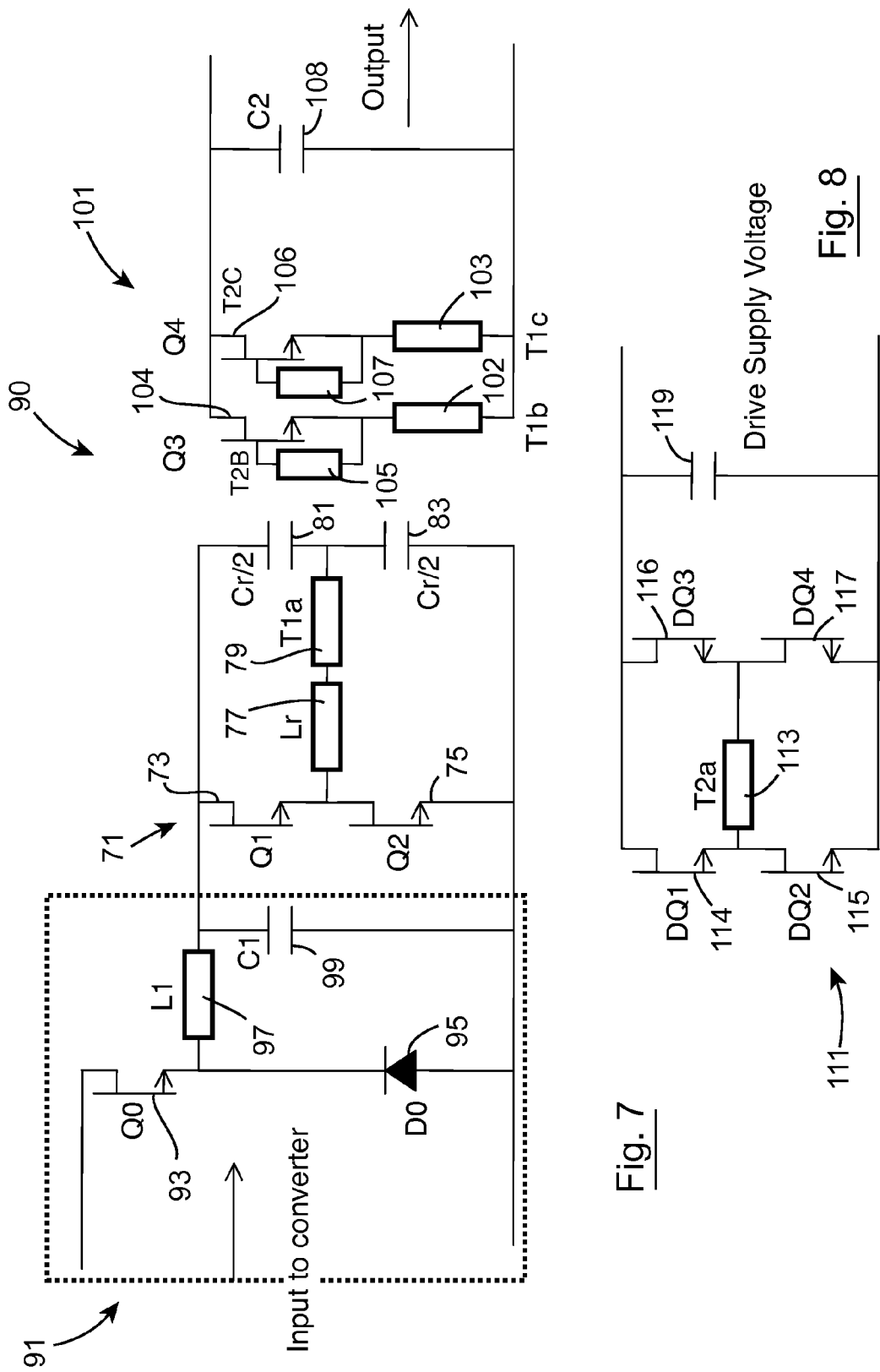
FIG. 7 is a circuit schematic representation of a power converter with a half bridge implementation of series resonant converter according to the invention.
FIG. 8 is a circuit schematic of the control circuit for the drive supply voltage.

Referring to FIG. 7 of the drawings, there is shown a circuit schematic representation of a power converter, indicated generally by the reference numeral 90, with a half bridge implementation of series resonant converter, indicated generally by the reference numeral 71, a pre-regulation stage indicated generally by the reference numeral 91 and an output stage, indicated generally by the reference numeral 101. The half bridge series resonant converter comprises a pair of switches 73, 75, a resonant inductor 77, a transformer primary 79 and a pair of resonant capacitors 81, 83. The current limiting diodes 85, 87 shown in FIG. 6 have been omitted from this implementation as current limiting diodes will not be required for all implementations. The pre-regulator stage further comprises a buck converter which in turn comprises a buck switch 93, a buck diode 95, a buck inductor 97 and a capacitor 99. The output stage 101 comprises a pair of main transformer secondary windings 102, 103 and a pair of output synchronous rectifiers, one of which comprises a switch 104 and a drive winding 105 and the other of which comprises a switch 106 and a drive winding 107. The output synchronous rectifier comprising the switch 104 and the drive winding 105 is associated with secondary winding 102 and the output synchronous rectifier comprising the switch 106 and the drive winding 107 is associated with secondary winding 103. The output stage 101 further comprises an output capacitor 108.

Referring to FIG. 8 of the drawings, there is shown the drive supply voltage circuit, indicated generally by the reference numeral 111. The drive supply voltage circuit comprises a primary drive winding 113, a plurality of FET switches 114, 115, 116, 117 and a decoupling capacitor 119.

The gate drive scheme has four phases of operation, the first phase is to drive one of the rectifier FETs 104, 106, followed by a second phase which comprises a deadtime where the drive winding 113 is clamped with zero volts across it and thus no rectifier FET is driven. This deadtime is followed by a third phase in which the other of the rectifying FETs 104, 106 is driven which in turn is followed by a fourth phase which is another period of deadtime where the drive winding is clamped with zero volts across it and thus no rectifier FET is being driven. In order to clamp the drive winding, one of the pairs of drive FETs 115 and 117 or 114 and 116 on opposite ends of the drive winding 113 are turned on therefore providing zero voltage across the drive winding.

Figure 9:
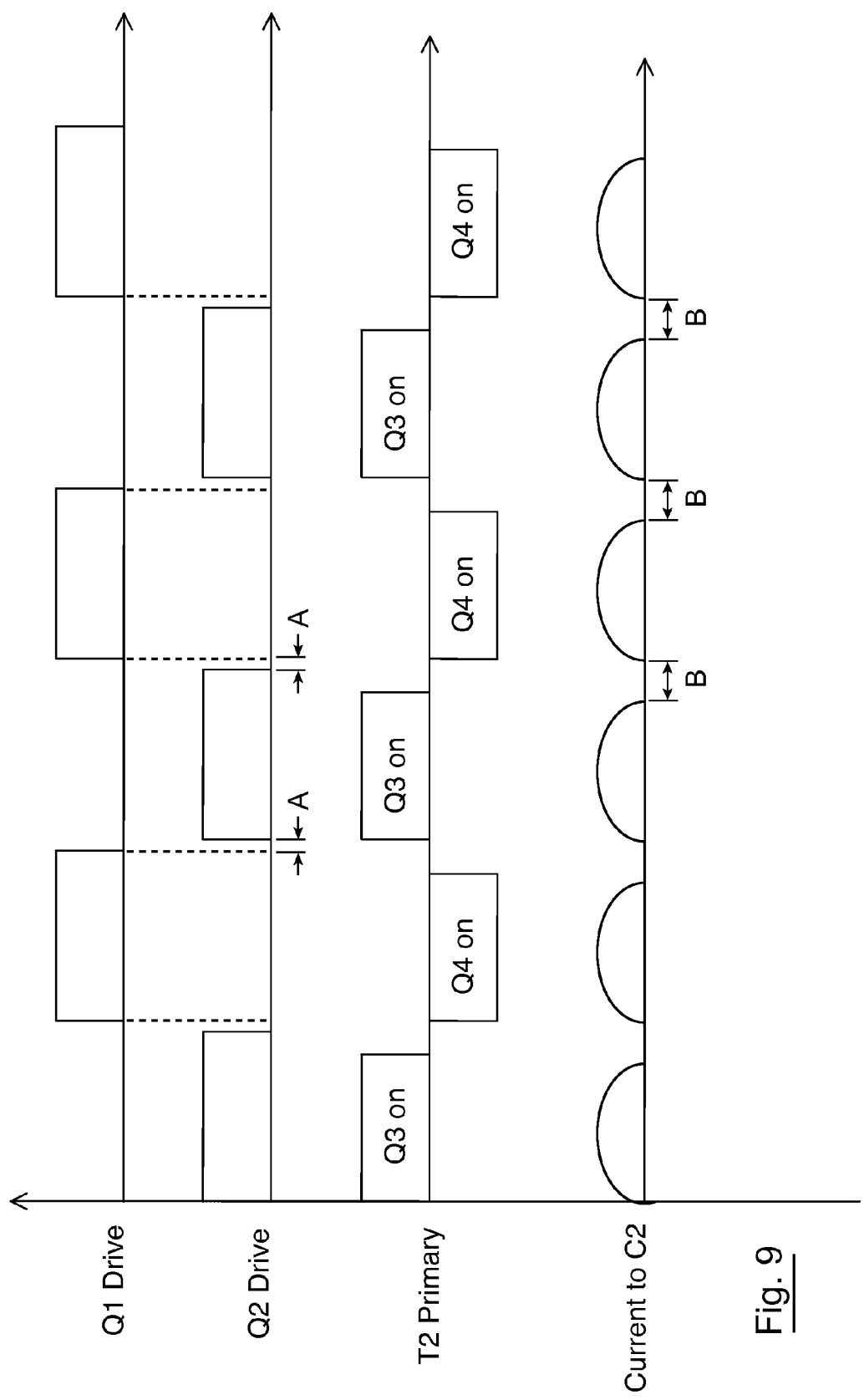
FIG. 9 shows wave diagrams relating to the circuits shown in FIGS. 7 and 8.

Referring to FIG. 9 of the drawings, there are shown wave diagrams of the key waveforms relevant to the power converters and the drive supply voltage circuits operation. From the top down, there is shown the drive voltage waveform of switch 73, the drive voltage waveform of switch 75, the voltage waveform of the drive supply voltage circuit primary drive winding 113 and the current to output capacitor 108 of the output stage 101. It can be seen that there is a gap "A" between the downslope of the drive voltage waveform of switch 73 and the upslope of the drive voltage waveform of switch 75 and between the downslope of drive voltage waveform of switch 75 and the upslope of drive voltage waveform of switch 73. This is the resonant transition deadtime to allow zero voltage switching of switches 73 and 75. It can be further seen that there is a gap "B" between adjacent pulses in the current waveform to the output capacitor. This deadtime is available for smearing. The control circuit is selected to provide the drive pattern shown to switches 73 and 75. Many different control circuits could be used for this purpose as would be readily understood by the person skilled in the art.

By operating the power converter at a frequency lower than the resonant frequency, the resonant wave period will be shorter than the power converter half period. By resonant frequency, what is meant is the resonant frequency of the LC elements (series inductor and series capacitor elements) in the series resonant converter. The means to alter the operating frequency over a limited range (i.e. ±5% of the resonant frequency about a mean operating frequency lower than the resonant frequency) typically comprises a programmed oscillator implementation. Any such oscillator that provides a square drive waveform as shown in the drawings at a varying frequency, preferably a slowly varying frequency, could be used and would be suitable for this task. The programmed drive circuitry could be used to implement a smearing approach to vary the frequency and thus spread the EMI spectrum. The operating frequency is altered over a limited range by adjusting the frequency of the drive signals to the switching elements in the control circuit. A full-bridge drive structure for the secondary can be used where the control circuitry is such as to clamp the drive winding during the deadtime. Alternatively a clamp winding is used which is switched in to maintain the current in the driver transformer.

In this specification the terms "comprise, comprises, comprised and comprising" and the terms "include, includes, included and including" are all deemed totally interchangeable and should be afforded the widest possible interpretation.

The invention is in no way limited to the embodiments hereinbefore described but may be varied in both construction and detail within the scope of the description and spirit of the invention.

The invention claimed is:

1. A power converter comprising a fixed ratio DCDC transformer section preceded by a pre-regulator section, wherein the fixed ratio DCDC transformer section further comprises an LLC resonant converter, and in which the operating frequency of the power converter is lower than the series resonant frequency of the LLC resonant converter and there is provided a control circuit operable to alter the operating frequency of the power converter over a limited range with respect to the resonant frequency in which a voltage/frequency characteristics is substantially flat wherein altering the frequency and that range will not cause a substantial increase in voltage.

2. A power converter as claimed in claim 1 in which the control circuit is operable to continuously gradually alter the operating frequency of the power converter over the limited range with respect to the resonant frequency.

3. A power converter as claimed in claim 1 in which the control circuit is operable to sequentially alter the operating frequency of the power converter by a predetermined amount over the limited range with respect to the resonant frequency.

4. A power converter as claimed in claim 1 in which the control circuit is operable to alter the operating frequency over a range of up to 30% of the resonant frequency.

5. A power converter as claimed in claim 1 in which the control circuit is operable to alter the operating frequency of the converter to create a non-zero deadtime in the feed to the output capacitor.

6. A power converter as claimed in claim 1 in which the control circuit has means to alter the operating frequency of the converter by adjusting the frequency of the drive signals to a plurality of switching elements in the control circuit.

7. A power converter as claimed in claim 1 in which there is provided a secondary switch drive scheme, the secondary switch drive scheme comprising one of a full bridge drive structure or a half bridge structure.

8. A power converter as claimed in claim 1 in which a secondary switch drive scheme comprises a damped resonant transition drive circuit switchable to maintain current in a resonant damp drive transformer on the secondary side.

9. A power converter as claimed in claim 1 in which the control circuit operable to alter the operating frequency of the converter comprises a synchronisation circuit to synchronise to an external oscillator.

10. A power converter as claimed in claim 1 in which the control circuit operable to alter the operating frequency of the converter has means to varying the operating frequency of the power converter over a limited range to generate frequency smearing which limits spectral peaks by spreading an EMI spectrum.

11. A method of operating a power converter of the type comprising a fixed ratio DCDC transformer section preceded by a pre-regulator section, the power converter further comprising an LLC resonant converter operating at a resonant frequency and a control circuit, the method comprising the steps of:
   operating the power converter at an operating frequency lower than the resonant frequency of the LLC resonant converter; and
   altering the operating frequency of the converter over a limited range with respect to the resonant frequency in which a voltage/frequency characteristics is substantially flat wherein altering the frequency and that range will not cause a substantial increase in voltage.

12. A method as claimed in claim 11 further comprising the step of continuously gradually altering the operating frequency of the power converter over the limited range with respect to the resonant frequency.

13. A method as claimed in claim 11 further comprising the step of sequentially altering the operating frequency of the power converter by a predetermined amount over the limited range with respect to the resonant frequency.

14. A method as claimed in claim 11 in which the method comprises altering the operating frequency over a range of up to 20% of the resonant frequency.

15. A method as claimed in claim 11 further comprising the step of altering the operating frequency of the converter to create a non-zero deadtime in the feed to the output capacitor.

16. A method as claimed in claim 11 further comprising the step of damping a drive winding during a deadtime.

17. A method as claimed in claim 11 further comprising the step of switching a clamp winding to maintain current in a resonant damp drive transformer on the secondary side.

18. A method as claimed in claim 11 further comprising the step of altering the operating frequency of the converter varying the operating frequency of the power converter over a limited range to generate frequency smearing which limits spectral peaks by spreading an EMI spectrum.

* * * * *